United States Patent
Fan et al.

(10) Patent No.: US 11,658,760 B2
(45) Date of Patent: *May 23, 2023

(54) METHOD FOR ALLOCATING WIRELESS RESOURCES BASED ON SENSITIVITY TO INTER-CELL INTERFERENCE AND APPARATUS THEREOF

(71) Applicant: HON LIN TECHNOLOGY CO., LTD., Taipei (TW)

(72) Inventors: Chia-Jung Fan, Hsinchu (TW);
Chien-Jen Hwang, Hsinchu (TW);
Ching-Ju Lin, Hsinchu (TW);
Ping-Jung Hsieh, Hsinchu (TW);
Ming-Yu Lee, Hsinchu (TW)

(73) Assignee: HON LIN TECHNOLOGY CO., LTD., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,076

(22) Filed: Jul. 1, 2022

(65) Prior Publication Data

US 2022/0337332 A1  Oct. 20, 2022

Related U.S. Application Data

(63) Continuation of application No. 17/313,321, filed on May 6, 2021, now Pat. No. 11,438,085.

(Continued)

(51) Int. Cl.
*H04J 11/00* (2006.01)
*H04W 28/02* (2009.01)
(Continued)

(52) U.S. Cl.
CPC ....... *H04J 11/005* (2013.01); *H04W 28/0236* (2013.01); *H04W 28/22* (2013.01); *H04W 72/541* (2023.01)

(58) Field of Classification Search
CPC ......... H04J 11/005–0059; H04W 72/04–0493; H04W 72/08–087; H04W 28/02–0294; H04W 28/22; H04B 7/024
See application file for complete search history.

(56) References Cited

U.S. PATENT DOCUMENTS 9,037,174 B2  5/2015  Koutsimanis et al.
2012/0300662 A1 * 11/2012 Wang ............... H04W 72/02
370/252
(Continued)

FOREIGN PATENT DOCUMENTS

JP  2016092805 A  5/2016
WO  WO-2011028158 A1 *  3/2011  ............ H04B 7/024
(Continued)

*Primary Examiner* — Chi H Pham
*Assistant Examiner* — Vladislav Y Agureyev
(74) *Attorney, Agent, or Firm* — ScienBiziP, P.C.

(57) ABSTRACT

A method for allocating wireless resources based on sensitivity to interference provides a base station controller which, within an area of overlap of adjacent wireless cells, determines a set of neighboring cell pairs from a plurality of cells. The base station controller sorts the set of neighboring cell pairs according to the number of inner-pair interfered user equipment devices of each neighboring cell pair where inner-pair interfered user equipment devices are user equipment devices located in coverage areas of the neighboring cell pair and allocates resource blocks for each neighboring cell pair sequentially based on the sorted set. An apparatus employing the method is also disclosed.

14 Claims, 6 Drawing Sheets

Related U.S. Application Data

(60) Provisional application No. 63/121,004, filed on Dec. 3, 2020.

(51) Int. Cl.
*H04W 28/22* (2009.01)
*H04W 72/541* (2023.01)

(56) References Cited

U.S. PATENT DOCUMENTS

| | | | |
|---|---|---|---|
| 2013/0231125 A1* | 9/2013 | Jeon | H04L 1/0026 |
| | | | 455/452.1 |
| 2017/0111926 A1* | 4/2017 | Madan | H04W 72/542 |
| 2017/0250747 A1* | 8/2017 | Reinhardt | H04B 7/0619 |
| 2018/0213514 A1* | 7/2018 | Zhuang | H04W 72/541 |
| 2018/0255482 A1* | 9/2018 | Song | H04W 28/16 |
| 2019/0253118 A1* | 8/2019 | Park | H04B 7/0626 |
| 2019/0363810 A1* | 11/2019 | Luo | H04B 17/336 |
| 2019/0364435 A1* | 11/2019 | Ahmavaara | H04W 24/08 |
| 2020/0068577 A1* | 2/2020 | Xie | H04W 72/23 |
| 2021/0144574 A1* | 5/2021 | Jin | H04L 5/0051 |
| 2022/0095144 A1* | 3/2022 | Ren | H04W 24/10 |
| 2022/0303108 A1* | 9/2022 | Faxér | H04L 5/1461 |
| 2023/0030518 A1* | 2/2023 | Ren | H04W 52/243 |

FOREIGN PATENT DOCUMENTS

| | | | | |
|---|---|---|---|---|
| WO | 2011100676 A1 | 8/2011 | | |
| WO | WO-2017091029 A1 * | 6/2017 | | H04B 7/024 |

\* cited by examiner

METHOD FOR ALLOCATING WIRELESS RESOURCES BASED ON SENSITIVITY TO INTER-CELL INTERFERENCE AND APPARATUS THEREOF

FIELD

The subject matter herein generally relates to wireless communications, and more particularly, to a method for allocating wireless resources based on sensitivity to inter-cell interference, and an apparatus thereof.

BACKGROUND

Inter-cell interference (ICI) can lead to a significant degradation in user throughput and service quality in wireless communications. Conventional approaches to address this challenge can apply schemes for muting, however, resource utilization becomes inefficient while using schemes based on muting.

Coordinated multi-point transmission and reception (CoMP) is seen as achieving a higher resource efficiency. Base station (BS) cooperation can be one of the most important enabling technologies beneficial in high ICI scenario. But for users located within the cell edge, the data rate is reduced because of residual interference of MIMO equalization due to channel correlation. At the same time, many BSs in the CoMP cluster in the uplink (UL) would require a larger number of orthogonal UL pilot sequences, and the CoMP gains are out-weighed by losses in capacity due to additional pilot effort.

Achieving a target throughput in resource allocation within a system is problematic.

BRIEF DESCRIPTION OF THE DRAWINGS

Implementations of the present technology will now be described, by way of embodiment, with reference to the attached figures, wherein.

DETAILED DESCRIPTION

Figure 1:
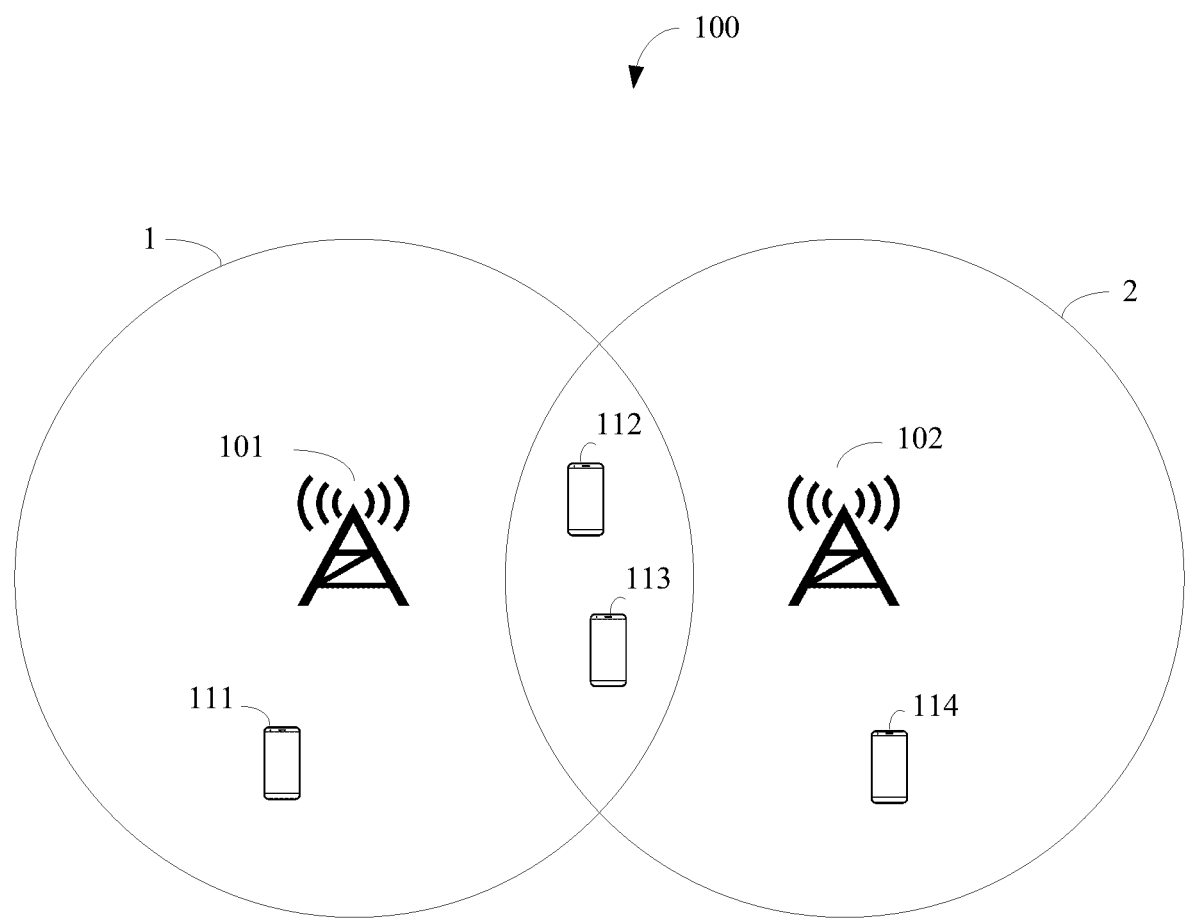
FIG. 1 is a schematic diagram of one embodiment of a wireless communication system including base stations and several user equipment devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

Technologies described in the present application may be applied to various wireless communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, or a future 5G system.

The present application describes various aspects with reference to base station and user equipment devices.

Base station (BS) refer to one or more apparatus in communication with one or more wireless terminals in a radio access network. The BS may be configured to receive an over-the-air frame and an IP packet and serve as a router between the wireless terminal and remainder of the radio access network, where the remainder may include an Internet protocol (IP) network. The BS may coordinate management of attributes of the air interface. For example, the BS may comprise a BS controller, and a base transceiver station (BTS) in GSM or the CDMA, it may be a BS (NodeB) in WCDMA, an evolved NodeB (eNB, or e-NodeB, or evolutional Node B) in the LTE, or a baseband unit (BBU), a remote radio unit (RRU) in C-RAN, not being limited in this application.

User equipment device (UE) comprises a wireless terminal. The wireless terminal may refer to an apparatus that provides a user with voice and/or data connectivity, a handheld device with a radio connection function, or other processing device connected to a wireless modem. The wireless terminal may communicate through a radio access network. The wireless terminal may be a mobile terminal, such as a mobile phone (also referred to as a "cellular" phone), or a computer with a mobile terminal for example, it may be a portable, pocket-sized, or handheld device, have a computer built-in, or be in-vehicle mobile apparatus, exchanges voice/data signals with the radio access network.

FIG. 1 illustrates a wireless communication system 100 wherein interference occurs between neighboring wireless cells. It should be understood that the system 100 can comprise any number of cells, UEs, and BSs. The system 100 comprises a plurality of cells, wherein each cell is managed by at least one BS. As shown in FIG. 1, the two wireless cells 1 and 2 are respectively managed by BS 101 and BS 102. It should be understood, although the embodiment shows a scenario comprising two wireless cells, the present application is applicable to three or more cells. A plurality of UEs 111, 112, 113, and 114 have wireless access through at least one BS of the system 100. In one embodiment, each UE communicates with cell 1 or cell 2 based on a maximal received signal strength indication (RSSI). As shown in FIG. 1, the coverage area of the two wireless cells can overlap, such overlap may lead to strong inter-cell interference, which degrades system throughput.

Figure 2:
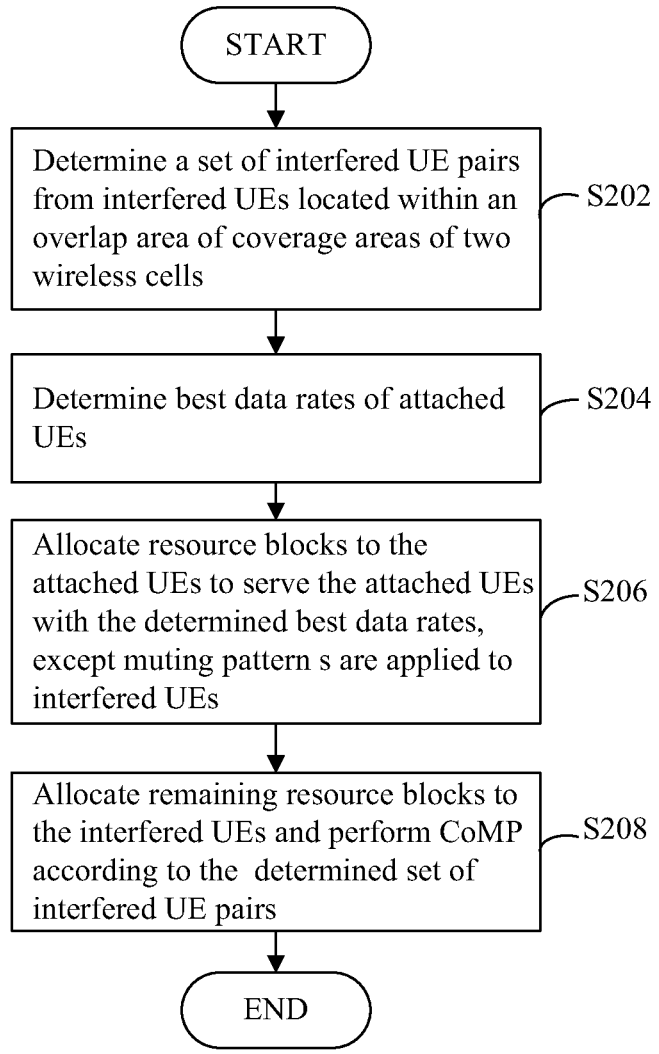
FIG. 2 is a flow chart of one embodiment of an interference-sensitive resource allocation method.

FIG. 2 illustrates a method for wireless resource allocation that exploits a capability for cancelling inter-cell interference for two neighboring wireless cells. The method is also referred as a two-cell resource allocation algorithm in the present disclosure. In one embodiment, BS 101 and BS 102 are spaced from each other by a predetermined distance. A BS controller (not shown in FIG. 1) can manage BS 101 and BS 102, in controlling operations of both BSs and resource allocation for the UEs in communication with the BSs. The BS controller is connected to each BS through a cable or a dedicated line. The BS controller can execute the method shown in FIG. 2. In another embodiment, BS 101 and BS 102 may be connected through an X2 interface and any neighboring BSs may have a mesh network structure having the X2 interface. One BS may be used for executing the method shown in FIG. 2. It should be noted that the underlying concept of the present embodiment(s) does not change if one or more blocks (or steps) are added to or removed from the process flow. It also should be noted that each cell is served by a BS, so when UE is described as being attached to a cell, it is also attached to the particular BS associated with the cell and attached to the BS controller of the particular BS.

In Step S202, the BS controller determines a set of interfered UE pairs from interfered UEs located within an overlap area of coverage areas of two wireless cells. Each interfered UE pair comprises two interfered UEs that one interfered UE which can only perform CoMP and share resource blocks with the other interfered UE of the interfered UE pair.

In the embodiment, a plurality of UEs are attached to the two wireless cells, where the plurality of attached UEs comprise interfered UEs located within the overlap area of coverage areas of two wireless cells and each interfered UE is communicating with the first cell or the second cell based on a maximal received signal strength indication (RSSI). In one embodiment, each interfered UE of the pair transmits a predetermined minimum number of overlapped pilots over subcarriers. In the embodiment, in order to perform CoMP, the number of overlapped pilots transmitted over subcarriers must be no lower than the predetermined minimum value. For example, for two BSs and one pair of interfered UEs that form a 2×2 multi-input multi-output (MIMO) network, the predetermined minimum value is 2.

Figure 3:
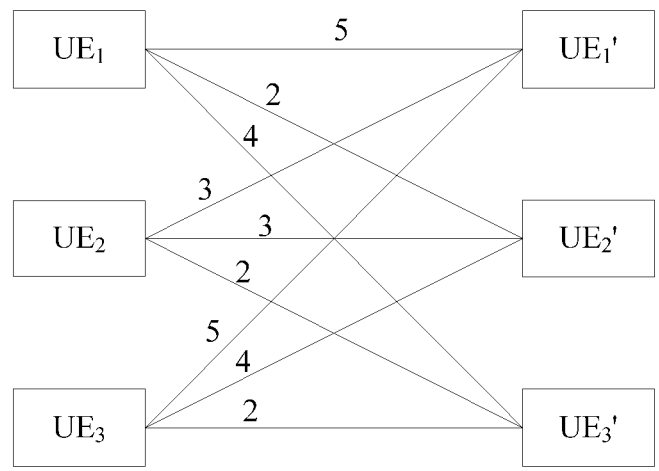
FIG. 3 is an example of one embodiment of a weighted bipartite graph of a plurality of interfered user equipment devices.

In one embodiment, the set of interfered UE pairs are determined using a weighted bipartite graph $G(U_1, U_2, E)$. An example of the weighted bipartite graph is shown in FIG. 3. The weighted bipartite $G(U_1, U_2, E)$ is constructed by the BS controller, where $U_1$ comprises interfered UEs attached to the first cell, $U_2$ comprises interfered UEs attached to the second cell, and E comprises edges between each interfered UE in $U_1$ and each interfered UE in $U_2$. Each edge is assigned a weight by the BS controller, where the weight of the edge is equal to a decrease of data rate that two interfered UEs connected by the edge perform CoMP. The decrease of data rate can be computed according to the sum of the data rates of two interfered UEs before performing CoMP minus the sum of the data rates of the same two interfered UEs dafter performing CoMP. In one embodiment, in order to minimize the decrease of data rate when performing CoMP, the BS controller determines the set of interfered UE pairs by applying a Hungarian algorithm to the weighted bipartite graph $G(U^I, U^n, E)$.

In Step S204, the BS controller determines best data rates of all attached UEs of the two wireless cells. In one embodiment, the BS controller determines best data rate of one attached UE based on the channel quality information (CQI) reported by the attached UE, transmit power control (TPC) commands of associated dedicated channels, and acknowledgement (ACK)/non-acknowledgement (NACK) feedback of previous transmission of the attached UE.

In Step S206, the BS controller allocates resource blocks to the attached UEs to serve the attached UEs with the determined best data rates, except muting patterns are applied to interfered UEs.

In Step S208, the BS controller allocates remaining resource blocks to the interfered UEs and performs CoMP according to the determined set of interfered UE pairs.

In one embodiment, the BS controller determines whether traffic demands of the attached UEs are satisfied. In the embodiment, the BS controller terminates resource allocation or re-allocation when traffic demands of the attached UEs are satisfied or not satisfied.

Figure 4:
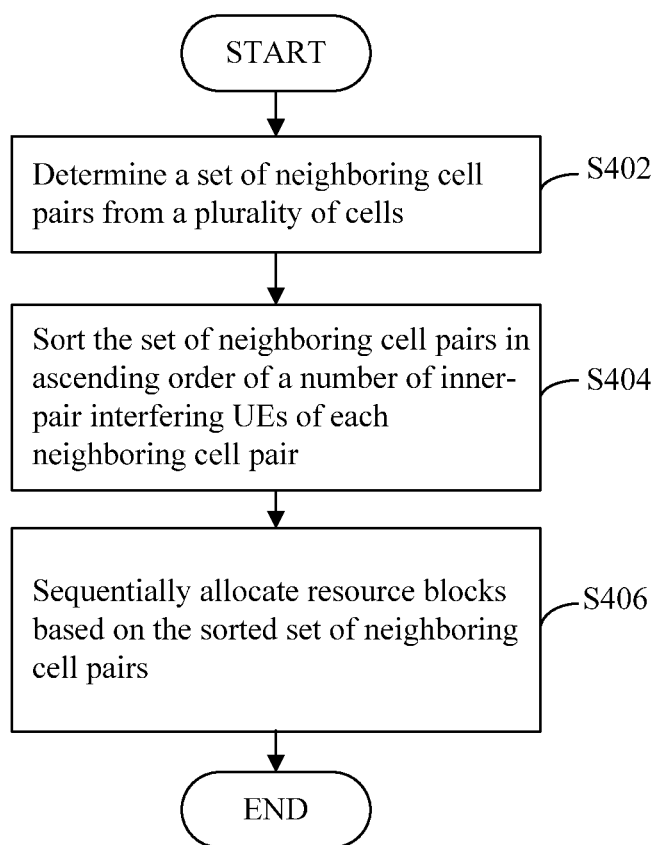
FIG. 4 is a flow chart of another embodiment of the interference-sensitive resource allocation method.

FIG. 4 illustrates a method for resource allocation that exploits a capability for cancelling inter-cell interference in a multi-cell scenario.

In Step S402, the BS controller determines a set of neighboring cell pairs from a plurality of wireless cells. Each pair comprises two neighboring wireless cells that the BSs of the two neighboring wireless cells can perform CoMP. In one embodiment, the BS controller classifies each interfered UE of the plurality of wireless cells as an inner-pair interfered UE or a cross-pair interfered UE while determining the set of neighboring cell pairs. The inner-pair interfered UE is an interfered UE that located in the coverage areas of one neighboring cell pair. The cross-pair interfered UE is an interfered UE that located in the coverage areas of different neighboring cell pairs. The inner-pair interfered UE can be allocated resource blocks with CoMP performed, while the cross-pair interfered UE should be allocated resource blocks orthogonally that may decrease system throughput.

In one embodiment, the BS controller determines the set of neighboring cell pairs based on an objective which is to minimize the number of cross-pair interfered UEs and maximize the number of inner-pair interfered UEs.

Figure 5:
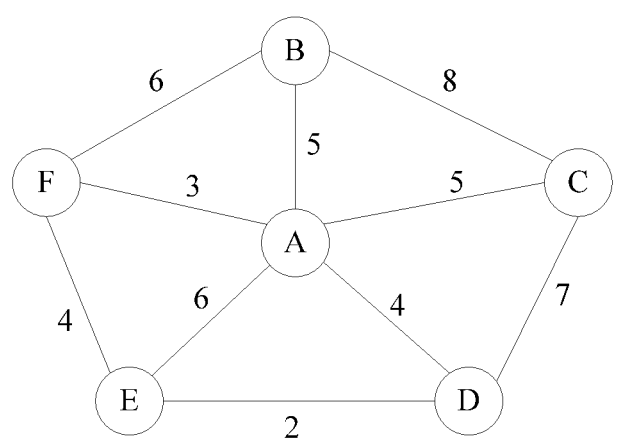
FIG. 5 is an example of one embodiment of a weighted independent edge set of a plurality of wireless cells.

In one embodiment, the set of neighboring cell pairs are determined based on a weighted independent edge set G(V, E). The weighted independent edge set G(V, E) is constructed by the BS controller, where V is a set of the plurality of cells, and E is a set of edges between any two neighboring cells. The weight of the edge connected a cell Ci and a cell Cj is equal to a number of inner-pair interfered UEs of the cell pair (Ci, Cj). In one embodiment, in order to maximize the number of inner-pair interfered UEs between any two neighboring wireless cells of the plurality of cells, the BS controller determines the set of neighboring cell pairs by applying a blossom algorithm to the weighted independent edge set. FIG. 5 shows an example of the weighted independent edge set with cell A, B, C, D, and E. After applied blossom algorithm to the weighted independent edge set would obtain a matching result comprises a set of neighboring cell pairs that are (B, F), (A, E), and (C, D). The number of inner-pair interfered UEs for the set of neighboring cell pairs is 19, and the number of cross-pair interfered UEs for the set of neighboring cell pairs is 31.

In Step S404, the BS controller sorts the set of neighboring cell pairs in ascending order of number of inner-pair interfered UEs of each neighboring cell pair.

In Step S406, the BS controller sequentially allocates resource blocks based on the sorted set of neighboring cell pairs. In one embodiment, for each neighboring cell pair, the BS controller performs the two-cell resource allocation algorithm shown in FIG. 2 to allocate available resource blocks of the neighboring cell pair and adjusts available resource blocks of other neighboring cell pairs after allocating resource blocks for the cross-pair interfered UEs.

Figure 6:
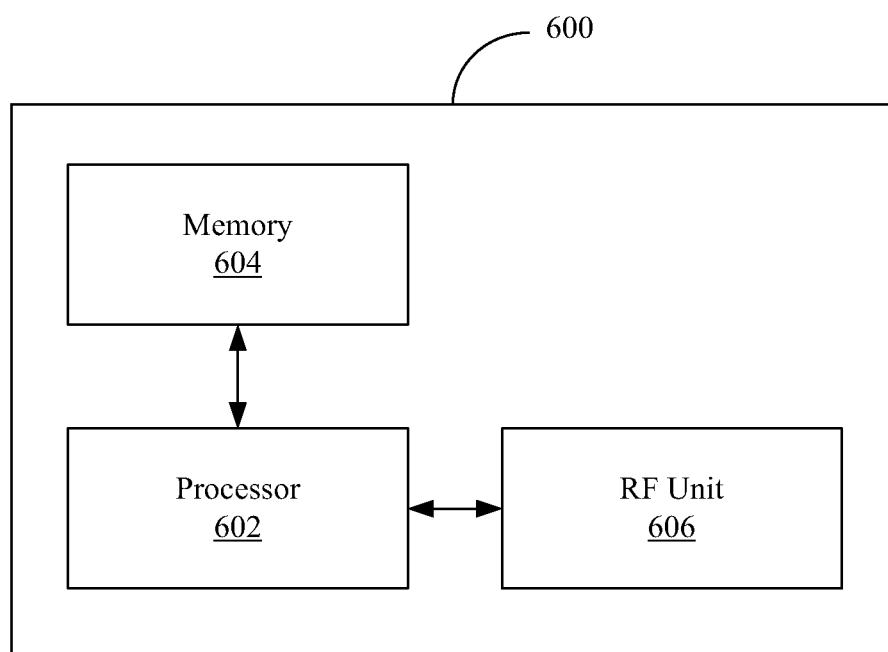
FIG. 6 is a block diagram of one embodiment of an apparatus for interference-sensitive resource allocation.

FIG. 6 illustrates an apparatus 600 for interference aware resource allocation. The apparatus 600 comprises a processor 602, a memory 604, and a radio frequency (RF) unit 606. The processor 602 comprises a microcontroller, a microprocessor, a complex instruction set arithmetic microprocessor, a reduced instruction set arithmetic microprocessor, an ultra-long instruction set microprocessor, an ultra-parallel instruction set arithmetic microprocessor, and a digital signal processor or other circuit with computational processing capabilities. The processor 602 implements the method disclosed. The memory 604 comprises a read-only memory (ROM), a random access memory (RAM), a magnetic storage medium device, an optical storage medium device, a flash memory device, an electrical, optical, or other computer-readable storage medium device which is physical/tangible and is non-transitory. The memory 604 is coupled with the processor 602 to store one or more computer programs that control the operation of the apparatus 600, and are executed by the processor 602. The RF unit 606 is coupled with the processor 602 to transmit and/or receive radio signals.

The embodiments shown and described above are only examples. Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for allocating wireless resources based on sensitivity to inter-cell interference performed by a base station controller, the method comprising the steps of:
determining a set of neighboring cell pairs from a plurality of cells, wherein each neighboring cell pair comprises two neighboring cells that base stations of the two neighboring cells can perform coordinated multi-point transmission and reception (CoMP); and
for each neighboring cell pair, allocating available resource blocks of the neighboring cell pair using a two-cell resource allocation algorithm and adjusting available resource blocks of other neighboring cell pairs after allocating resource blocks for cross-pair interfered UEs, wherein the cross-pair interfered UEs are interfered UEs located in coverage areas of different neighboring cell pairs.

2. The method of claim 1, wherein the step of determining a set of neighboring cell pairs from a plurality of cells further comprises the steps of:
constructing a weighted independent edge set G(V, E), wherein V is a set of the plurality of cells, and E is a set of edges between any two neighboring cells, and each edge is assigned a weight which is equal to a number of inner-pair interfered UEs of the two neighboring cells; and
applying a blossom algorithm to the weighted independent edge set to determine the set of neighboring cell pairs.

3. The method of claim 1, wherein the method further comprises the step of:
sorting the set of neighboring cell pairs before allocation available resource blocks for each neighboring cell pair.

4. The method of claim 1, wherein the two-cell resource allocation algorithm further comprises the steps of:
determining a set of interfered UE pairs from interfered UEs located within an overlap area of coverage areas of two wireless cells, wherein each interfered UE pair comprises two interfered UEs that one interfered UE can only perform CoMP and share resource blocks with the other interfered UE of the interfered UE pair;
determining best data rates of all attached UEs to the two wireless cells;
allocating resource blocks to the attached UEs to serve the attached UEs with the determined best data rates, except muting pattern are applied to the interfered UEs;
allocating remaining resource blocks to the interfered UEs and performing CoMP according to the determined set of interfered UE pairs.

5. The method of claim 4, wherein the step of determining a set of interfered UE pairs for interfered UEs located within an overlap area of coverage areas of two wireless cells further comprises the steps of:
constructing a weighted bipartite graph G(U1, U2, E), wherein U1 comprises interfered UEs attached to a first cell, U2 comprises interfered UEs attached to a second cell, E comprises edges between each interfered UE in U1 and each interfered UE in U2, and each edge is assigned a weight which is equal to a decrease of data rate that two interfered UEs connected by the edge perform CoMP; and
applying a Hungarian algorithm to the weighted bipartite graph to determine the set of interfered UE pairs.

6. The method of claim 5, wherein the decrease of data rate is computed according to a sum of data rates of the two interfered UEs before performing CoMP minus a sum of data rates of the two interfered UEs after performing CoMP.

7. The method of claim 4, wherein the two-cell resource allocation algorithm further comprises the steps of:
determining whether traffic demands of the attached UEs are satisfied; and
terminating resource allocation when the traffic demands of the attached UEs are satisfied.

8. An apparatus for allocating wireless resources based on sensitivity to inter-cell interference, the apparatus comprising: a memory storing instructions; and a processor coupled to the memory and, when executing the instructions, configured for:
determining a set of neighboring cell pairs from a plurality of cells, wherein each neighboring cell pair comprises two neighboring cells that base stations of the two neighboring cells can perform coordinated multi-point transmission and reception (CoMP); and for each neighboring cell pair, allocating available resource blocks of the neighboring cell pair using a two-cell resource allocation algorithm and adjusting available resource blocks of other neighboring cell pairs after allocating resource blocks for cross-pair interfered UEs, wherein the cross-pair interfered UEs are interfered UEs located in coverage areas of different neighboring cell pairs.

9. The apparatus of claim 8, wherein the step of determining a set of neighboring cell pairs from a plurality of cells further comprises the steps of:
constructing a weighted independent edge set G(V, E), wherein V is a set of the plurality of cells, and E is a set of edges between any two neighboring cells, and each edge is assigned a weight which is equal to a number of inner-pair interfered UEs of the two neighboring cells; and
applying a blossom algorithm to the weighted independent edge set to determine the set of neighboring cell pairs.

10. The apparatus of claim 8, wherein the processor further configured for:
sorting the set of neighboring cell pairs before allocation available resource blocks for each neighboring cell pair.

11. The apparatus of claim 8, wherein the two-cell resource allocation algorithm further comprises the steps of:
determining a set of interfered UE pairs from interfered UEs located within an overlap area of coverage areas of two wireless cells, wherein each interfered UE pair comprises two interfered UEs that one interfered UE can only perform CoMP and share resource blocks with the other interfered UE of the interfered UE pair;
determining best data rates of all attached UEs to the two wireless cells;
allocating resource blocks to the attached UEs to serve the attached UEs with the determined best data rates, except muting patterns are applied to the interfered UEs;
allocating remaining resource blocks to the interfered UEs and performing CoMP according to the determined set of interfered UE pairs.

12. The apparatus of claim 11, wherein the step of determining a set of interfered UE pairs for interfered UEs located within an overlap area of coverage areas of two wireless cells further comprises the steps of:
constructing a weighted bipartite graph G(U1, U2, E), wherein U1 comprises interfered UEs attached to a first cell, U2 comprises interfered UEs attached to a second cell, E comprises edges between each interfered UE in U1 and each interfered UE in U2, and each edge is assigned a weight which is equal to a decrease of data rate that two interfered UEs connected by the edge perform CoMP; and
applying a Hungarian algorithm to the weighted bipartite graph to determine the set of interfered UE pairs.

13. The apparatus of claim 12, wherein the decrease of data rate is computed according to a sum of data rates of the two interfered UEs before performing CoMP minus a sum of data rates of the two interfered UEs after performing CoMP.

14. The apparatus of claim 11, wherein the two-cell resource allocation algorithm further comprises the steps of:
determining whether traffic demands of the attached UEs are satisfied; and
terminating resource allocation when the traffic demands of the attached UEs are satisfied.

* * * * *